(12) United States Patent
Seo

(10) Patent No.: US 11,556,048 B2
(45) Date of Patent: Jan. 17, 2023

(54) ELECTRONIC APPARATUS

(71) Applicant: CANON KABUSHIKI KAISHA, Tokyo (JP)

(72) Inventor: Takazumi Seo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/349,381

(22) Filed: Jun. 16, 2021

(65) Prior Publication Data

US 2021/0405507 A1    Dec. 30, 2021

(30) Foreign Application Priority Data

Jun. 25, 2020  (JP) .............................. JP2020-109436

(51) Int. Cl.
| | |
|---|---|
| *H04N 5/232* | (2006.01) |
| *G03B 13/06* | (2021.01) |
| *G03B 17/04* | (2021.01) |
| *G03B 13/34* | (2021.01) |
| *G02B 7/04* | (2021.01) |
| *H04N 5/225* | (2006.01) |

(52) U.S. Cl.
CPC .............. *G03B 13/34* (2013.01); *G02B 7/04* (2013.01); *G03B 13/06* (2013.01); *H04N 5/22525* (2018.08); *H04N 5/23293* (2013.01); *G03B 17/04* (2013.01)

(58) Field of Classification Search
CPC ............. H04N 5/23293; H04N 5/2252; H04N 5/225251; G03B 13/02; G03B 13/06; G03B 17/04

See application file for complete search history.

(56) References Cited

U.S. PATENT DOCUMENTS

| | | | |
|---|---|---|---|
| 2015/0029380 A1* | 1/2015 | Noh ..................... | H04N 5/2252 348/333.01 |
| 2019/0025670 A1* | 1/2019 | Inaba .................... | G03B 17/02 |
| 2019/0166290 A1* | 5/2019 | Suzuki .................. | G06F 3/0346 |
| 2020/0249547 A1* | 8/2020 | Iwai ..................... | H04N 5/2252 |
| 2020/0252530 A1* | 8/2020 | Iwai ..................... | H04N 5/2254 |
| 2021/0195078 A1* | 6/2021 | Okuno ............... | H04N 5/22525 |

FOREIGN PATENT DOCUMENTS

JP        2017-021303 A      1/2017

* cited by examiner

*Primary Examiner* — Christopher E Mahoney
(74) *Attorney, Agent, or Firm* — Canon U.S.A., Inc. I.P. Division

(57) ABSTRACT

An electronic viewfinder unit includes a finder unit and a base member. The finder unit includes a display unit, an eyepiece portion, and a lens holding member holding a lens that guides a light flux emitted from the display unit to the eyepiece portion. The base member includes a guide member configured to guide the electronic viewfinder unit to a housed state and a protruding state. The base member includes a holding portion and a turning member. The holding portion is provided with a first holding member and a second holding member that face each other with an optical axis of the lens in between. The turning member has one end held by the first holding member and another end held by the second holding member, and is turnable about an axis orthogonal to the optical axis of the lens.

7 Claims, 8 Drawing Sheets

A-A CROSS-SECTION

B-B CROSS-SECTION

A-A CROSS-SECTION

B-B CROSS-SECTION

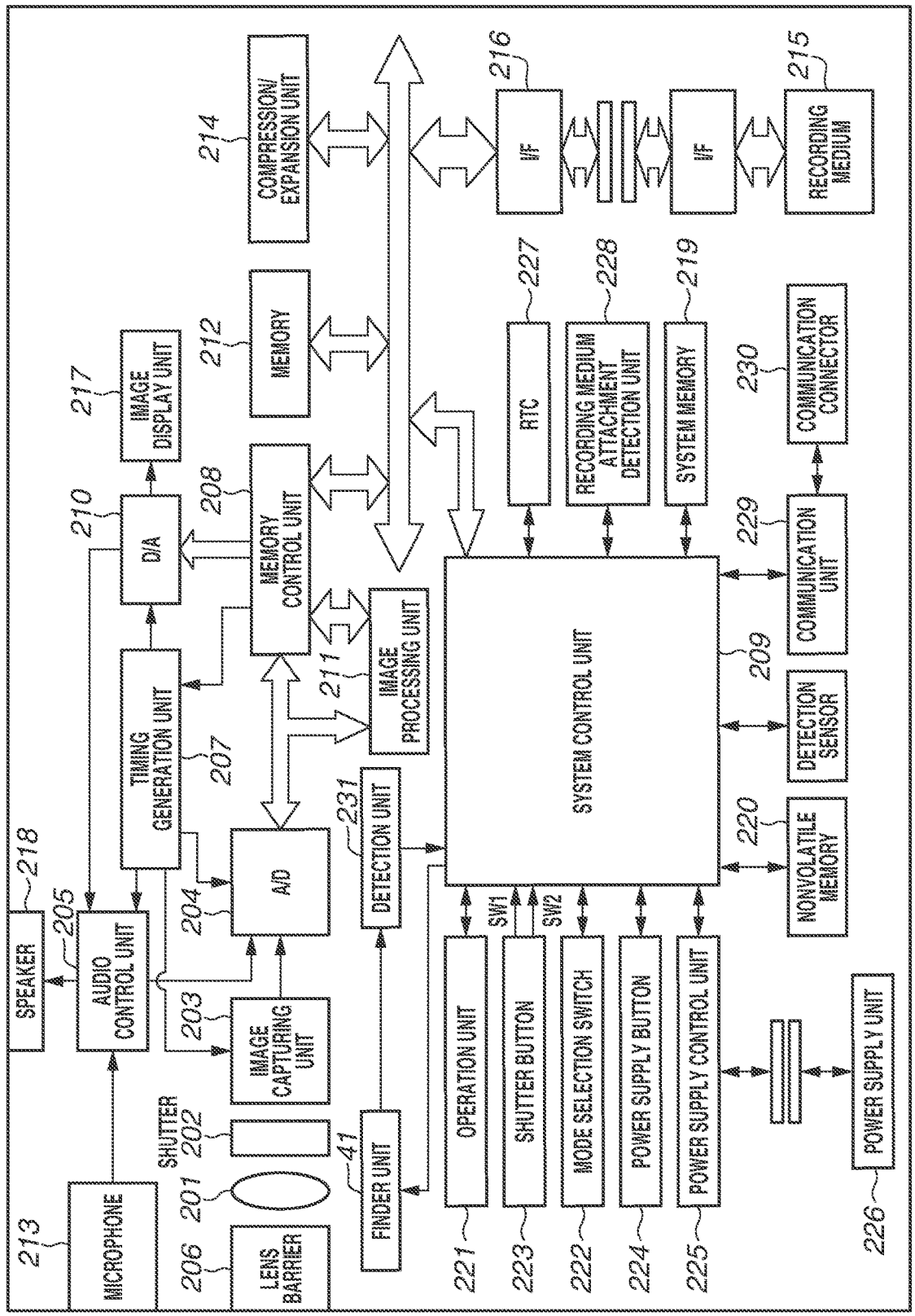

ELECTRONIC APPARATUS

BACKGROUND

Field of the Disclosure

The present disclosure generally relates to an electronic apparatus including an electronic viewfinder. In particular, the present disclosure relates to an image capturing apparatus such as a digital camera.

Description of the Related Art

As a camera including an electronic viewfinder (hereinafter, referred to as a finder), a camera in which the finder is turnable relative to a camera main body to increase a degree of freedom of an image capturing attitude of an operator has been known.

For example, Japanese Patent Application Laid-Open No. 2017-021303 discusses an image capturing apparatus including a finder that is turnable by a turning mechanism.

In the above-described technique discussed in Japanese Patent Application Laid-Open No. 2017-021303, however, the finder constantly protrudes from an outer shape of the image capturing apparatus.

This may affect portability when the image capturing apparatus is carried while not in use.

SUMMARY

The present disclosure includes aspects related to downsizing of a finder that is movable to be in a housed state and a protruding state and is turnable in the protruding state.

In addition, the present disclosure includes aspects related to an electronic apparatus that enables an improvement in a degree of freedom of an image capturing attitude of an operator when the electronic apparatus is in use and an improvement in portability when the electronic apparatus is not in use.

According to an aspect of the present disclosure, an electronic apparatus including an electronic viewfinder unit movable to a housed state where the electronic viewfinder unit is housed in a main body and a protruding state where the electronic viewfinder unit protrudes from the main body includes a finder unit of the electronic viewfinder unit including a display unit, an eyepiece portion, and a lens holding member holding a lens that guides a light flux emitted from the display unit to the eyepiece portion, and a base member of the electronic viewfinder unit including a guide member configured to guide the electronic viewfinder unit to the housed state and the protruding state, a holding portion being provided with a first holding member and a second holding member that face each other with an optical axis of the lens in between, and a turning member having one end held by the first holding member and another end held by the second holding member, the turning member being turnable about an axis orthogonal to the optical axis of the lens, wherein the finder unit is held by the turning member.

Further features of the present disclosure will become apparent from the following description of exemplary embodiments with reference to the attached drawings.

BRIEF DESCRIPTION OF THE DRAWINGS

FIG. 8 is a block diagram illustrating an entire configuration according to the exemplary embodiment of the present disclosure.

DESCRIPTION OF THE EMBODIMENTS

Figure 1A:
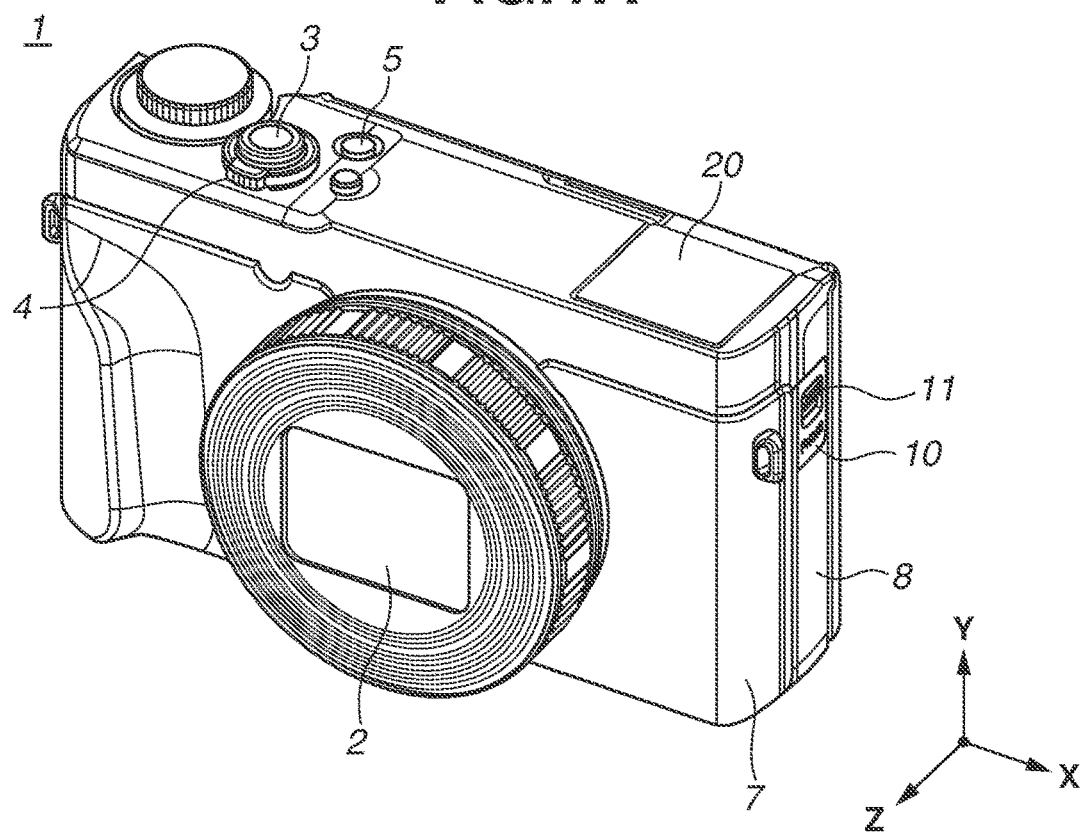
FIGS. 1A and 1B are perspective views each illustrating an image capturing apparatus according to an exemplary embodiment of the present disclosure.

An exemplary embodiment of the present disclosure is described in detail below with reference to the accompanying drawings. In the drawings, the same members are denoted by the same reference numerals, and repetitive descriptions are omitted.

(Appearance Configuration of Image Capturing Apparatus 1)

A configuration of an image capturing apparatus 1 that is an example of an image capturing apparatus as an electronic apparatus according to the exemplary embodiment of the present disclosure is described with reference to FIGS. 1A and 1B.

As illustrated in FIG. 1A, in the image capturing apparatus 1, an X direction, a Y direction, and a Z direction are defined as follows.

A lateral direction (horizontal direction) of the image capturing apparatus 1 is defined as the X direction.

A vertical direction (perpendicular direction of the Image capturing apparatus 1 is defined as the Y direction. A direction in which a finder unit 20 moves from a housed state to a protruding state is the Y direction.

An optical axis direction of a lens barrel unit 2, or an optical axis direction of the finder unit 20, is defined as the Z direction.

An electronic viewfinder is abbreviated as an EVE

Figure 1B:
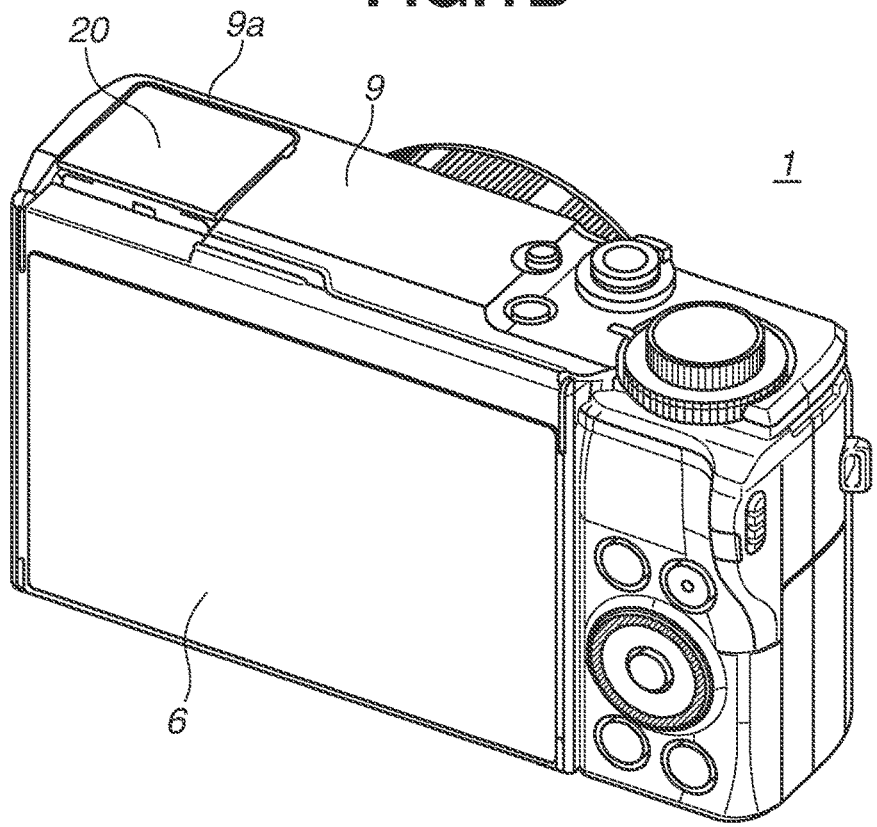

FIGS. 1A and 1B are perspective views each illustrating the image capturing apparatus 1. FIG. 1A and FIG. 1B are a front perspective view and a rear perspective view of the image capturing apparatus 1, respectively.

The image capturing apparatus 1 as the electronic apparatus includes the lens barrel unit 2 including an image capturing optical system (not illustrated).

The image capturing apparatus 1 further includes an image capturing; device (not illustrated) that photoelectrically converts an optical image of an object formed through a plurality of image capturing lenses constituting the image capturing optical system, to generate image data.

The lens barrel unit 2 is of a retractable type, and is retracted inside the image capturing apparatus 1 when housed.

The image capturing apparatus 1 further includes a main substrate (not illustrated) and an auxiliary substrate (not illustrated) on which a processing circuit that converts the image data, which is generated by the image capturing device, into digital information is mounted.

When a release button 3 is fully pressed, image capturing is performed, and image data of an object image is recorded in a recording medium (not illustrated).

A zoom lever 4 is turnably held on an outer periphery of the release button 3. When the zoom lever 4 is turned, zoom operation is performed.

A power supply button 5 is depressed by an operator, and is switched to an on state (use state) or an off state (unused state).

A display device 6 is provided on a rear surface of the image capturing apparatus 1, and is used for checking of an object image to be captured and for reproduction display of a captured image.

The image capturing apparatus 1 as the electronic apparatus includes a main body which is covered with exterior members such as a front cover 7, a rear cover 8, and a top cover 9. The main body is an exterior member of the electronic apparatus.

The top cover 9 forms an upper surface of the image capturing apparatus 1, and includes an opening 9a for the finder unit 20.

The finder unit 20 is housed in the image capturing apparatus 1. When housed, the finder unit 20 is locked by a lock mechanism while being held inside the image capturing apparatus 1.

A side cover 10 forming part of an appearance surface is provided on a side surface of the image capturing apparatus 1.

An unlock lever 11 is slidably held to the side cover 10.

Figure 3A:
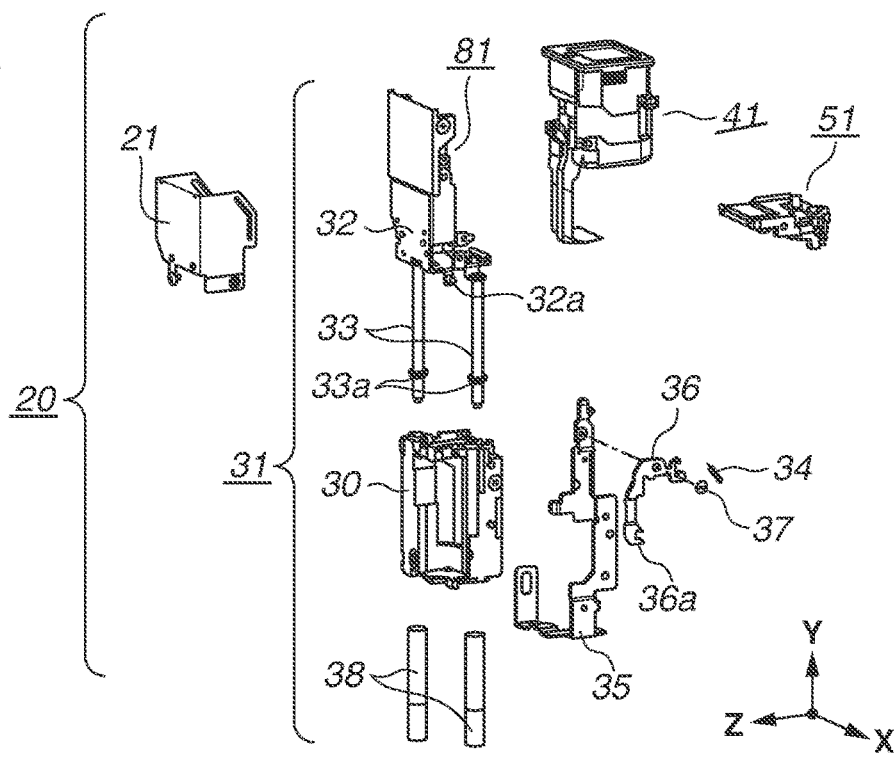
FIGS. 3A, 3B, 3C, and 3D are developed perspective views illustrating a configuration of the finder unit.

The finder unit 20 is unlocked by operating the unlock lever 11, and the finder unit 20 protrudes upward in the Y direction of the image capturing apparatus 1 by an urging member (see FIG. 3A).

(Description of Block Diagram in FIG. 8)

FIG. 8 is a block diagram illustrating a configuration example of the image capturing apparatus 1 as an example of the image capturing apparatus according to the exemplary embodiment of the present disclosure.

An optical system includes an image capturing lens 201 and a shutter 202 having an aperture function.

An image capturing unit 203 includes a charge-coupled device (CCD) or a complementary metal-oxide semiconductor (CMOS) device each converting an optical image input through the optical system into an electric signal.

An analog-to-digital (A/D) conversion unit 204 is used to convert analog signal output from the image capturing unit 203 into a digital signal, and to convert an analog signal output from an audio control unit 205 into a digital signal.

A lens barrier 206 covers the image capturing unit 203 including the image capturing lens 201 of the image capturing apparatus 1, to prevent the image capturing unit 203 from dirt and damage.

A timing generation unit 207 is controlled by a memory control unit 208 and a system control unit 209, and supplies a clock signal or a control signal to each of the image capturing unit 203, the audio control unit 205, the A/D conversion unit 204, and a digital-tip-analog (D/A) conversion unit 210.

An image processing unit 211 performs predetermined pixel interpolation, resizing processing such as reduction, and color conversion processing on data output from the A/D conversion unit 204 and data stored in a memory 212.

The image processing unit 211 also performs predetermined calculation on data of the captured image, and the system control unit 209 performs exposure control and ranging control based on an obtained calculation result.

As a result, through-the-lens (TTL) autofocus (AF) processing, automatic exposure (AE) processing, and flash preliminary emission (EF) are performed.

The image processing unit 211 further performs predetermined calculation processing using the data of the captured image, and also performs TTL automatic white balance (AWB) processing based on an obtained calculation result.

The data output from the A/D conversion unit 204 is written in the memory 212 through the image processing unit 211 and the memory control unit 208 or directly through the memory control unit 208.

The memory 212 stores an audio signal recorded by a microphone 213, a captured still image or a captured moving image, and attendant information about the Image, such as a file header, in a case where an image file is created.

The memory 212 has a storage capacity sufficient to store a predetermined number of still images, or a predetermined length of time of moving image and audio.

A compression/expansion unit 214 compresses and expands the image data using adaptive discrete cosine transformation (ADCT) or the like. The compression/expansion unit 214 reads the captured image stored in the memory 212 with the shutter 202 as a trigger, performs compression processing on the read image, and writes data of the processed image in the memory 212.

The compression/expansion unit 214 further reads a compressed image loaded into the memory 212 from a recording medium 215 or the like, performs expansion processing, and writes data of the processed image in the memory 212.

The image data written in the memory 212 by the compression/expansion unit 214 is made into a file by a file processing unit of the system control unit 209, and the file is recorded in the recording medium 215 via a recording medium interface (I/F) 216.

The memo 212 also functions as an image display memory. Display image data written in the memory 212 is displayed on an image display unit 217 via the D/A conversion unit 210.

An audio signal output from the microphone 213 is converted into a digital signal by the A/D conversion unit 204 via the audio control unit 205 including an amplifier, and the digital signal is stored in the memory 212 by the memory control unit 208.

In contrast, an audio signal recorded in the recording medium 215 is loaded into the memory 212 and is then processed by the audio control unit 205 via the D/A conversion unit 210, and the processed signal is sounded from a speaker 218.

The system control unit 209 controls the entire image capturing apparatus 1. A system memory 219 stores constants, variables, and programs for Operation of the system control unit 209.

A nonvolatile memory 220 is an electrically erasable/writable memory, and for example, an electrically erasable programmable read-only memory (EEPROM) is used.

A shutter switch 1 (SW1), a shutter switch 2 (SW2), and an operation unit 221 are operation means for a user to input various kinds of operation instructions to the system control unit 209.

A mode selection switch 222 is used by the user to select an operation mode of the system control unit 209 from among a still image capturing mode, a continuous image capturing mode, a moving image mode, a reproduction mode, and the like.

The shutter switch 1 (SW1) is turned on when a shutter button 223 provided in the image capturing apparatus 1 is operated halfway (half-pressed).

The shutter switch 1 instructs the system control unit 209 to start processing such as the AF processing, the AE processing, the AWB processing, and the EF processing.

The shutter switch 2 (SW2) is turned on when the shutter button 223 is operated completely (full-pressed), and instructs the system control unit 209 to start a series of operations of image capturing processing from reading of a signal from the image capturing unit 203 to writing of image data in the recording medium 215.

The operation unit 221 includes various kinds of buttons and a touch panel.

More specifically, the operation unit 221 includes a delete button, a menu button, a set button, and a four-way operational key including buttons arranged in a cross shape.

When the menu button is pressed, a menu screen for various kinds of settings is displayed on the image display unit 217.

The user can intuitively perform various kinds of settings by using the menu screen displayed on the image display unit 217, the four-way operational key, and the set button.

Alternatively, operation on an icon displayed on the image display unit 217 may be detected in a manner similar to operation on a button, a switch, or a dial by detecting a touch of a finger of the user or a stylus pen on an operation member.

Further, an operation member, rotation of which is detectable, such as a jog dial may be used for operation similar to a bidirectional key.

A power supply button 224 is used to switch power on and off.

A power supply control unit 225 includes a battery detection circuit, a direct current (DC)-DC converter, and a switch circuit that switches a block to be energized, and detects presence/absence of a mounted buttery, a type of the mounted buttery, and a remaining level of the mounted battery.

The power supply control unit 225 controls the DC-DC converter based on a result of the detection and an instruction from the system control unit 209, and supplies a necessary voltage to the units including the recording medium 215 for a necessary period of time.

A power supply unit 226 includes a primary battery such as an alkaline battery and a lithium battery, a secondary battery such as a nickel-cadmium (NiCd) buttery, a nickel-metal hydride (NiMH) battery, and a lithium (Li)-ion battery, or an alternating current (AC) adaptor.

The power supply unit 226 and the power supply control unit 225 are connected via a camera-side power supply connector and a power supply connector.

A real time clock (RTC) 227 internally holds a power supply unit different from the power supply control unit 225. The RTC 227 continuously counts time even when the power supply unit 226 is turned off.

The system control unit 209 performs timer control using a date and time acquired from the RTC 227 at activation.

A recording medium attachment detection unit 228 detects whether the recording medium 215 has been attached to a recording medium slot.

A communication unit 229 performs various kinds of communication processing using, for example, Recommended Standard 232 version C (RS-232C), a universal serial bus (USB), Institute of Electrical and Electronic Engineers (IEEE) 1394, P1284, small computer system interface (SCSI), a modern, a local area network (LAN), and wireless communication.

A communication connector 230 (antenna in the case of wireless communication) connects the image capturing apparatus 1 to another apparatus via the communication unit 229.

A detection unit 231 includes a detection sensor flexible substrate 71, which will be described below, and detects whether a finder unit 41 has been pulled out and is in a usable state. A sensor using a mechanical method or an optical method can be used in the detection unit 231.

When the detection unit 231 detects that the finder unit 41 is in the usable state and further detects that the user has looked into the finder unit 41, an image displayed on the image display unit 217 is switched to be displayed on the finder unit 41. Thus, the user can check the image displayed on the finder unit 41.

(Operation of Finder Unit 20)

Next, operation of the finder unit 20 according to the exemplary embodiment of the present disclosure illustrated in FIGS. 1A and 1B is described with reference to FIGS. 2A, 2B, and 2C.

Figure 2A:
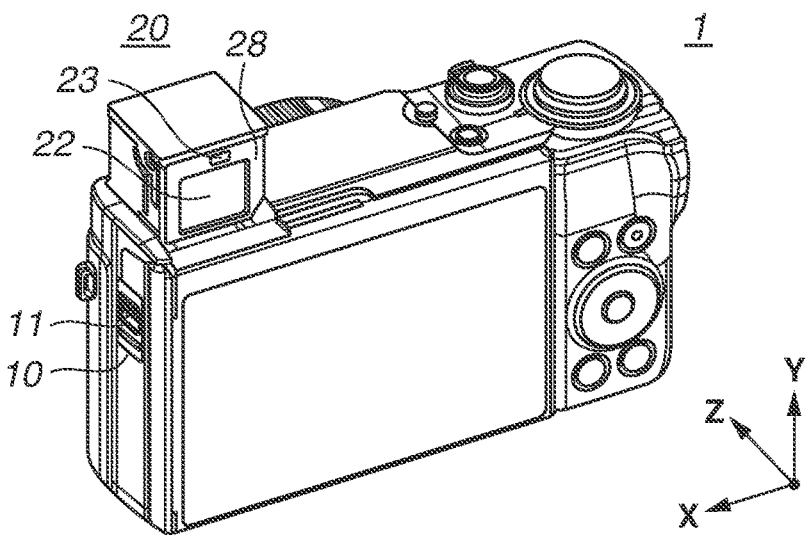
FIGS. 2A, 2B, and 2C are perspective views each illustrating the image capturing apparatus in a state where a finder unit protrudes.
Figure 2B:
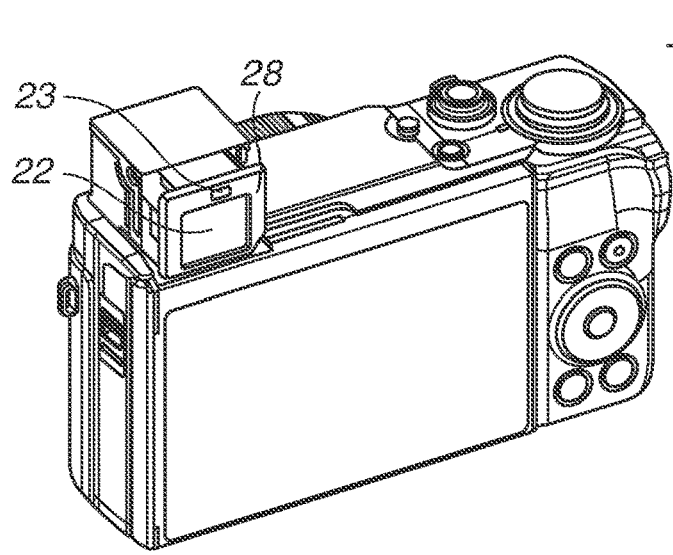
Figure 2C:
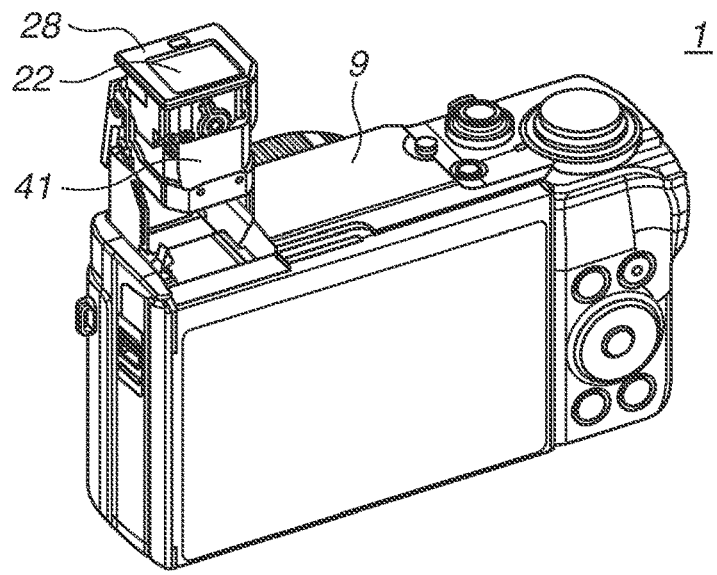

FIGS. 2A, 2B, and 2C are rear perspective views each illustrating the image capturing apparatus 1 in a state where the finder unit 20 protrudes.

FIG. 2A illustrates a state where the above-described unlock lever 11 disposed on the side cover 10 of the image capturing apparatus 1 is operated, and the finder unit 20 protrudes upward in the Y direction from the housed state where the finder unit 20 is housed inside the image capturing apparatus 1.

An eyepiece window 22 is fixed to an eyepiece portion 28. A sensor window 23 is provided on an upper side of the eyepiece window 22.

Figure 3B:
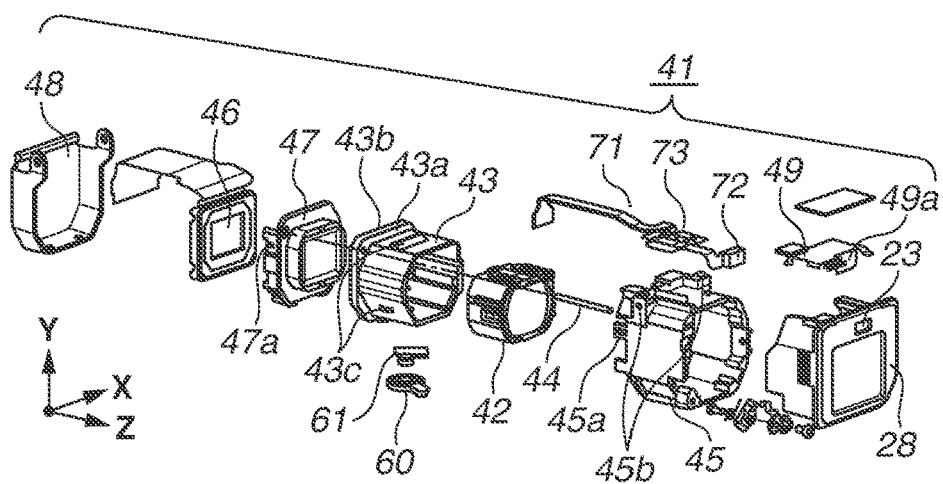

The sensor window 23 is provided for an optical path of an internal eyepiece sensor 72 (see FIG. 3B).

When the eyepiece sensor 72 detects that the user has looked into the eyepiece portion 28, display is switched to the display on the finder unit 20.

FIG. 2B illustrates a state where the eyepiece portion 28 of the finder unit 20 is pulled out in a −z direction of the image capturing apparatus 1 from the protruding state of the finder unit 20 in FIG. 2A.

The finder unit 20 becomes usable in the state where the eyepiece portion 28 is pulled out in the −Z direction, and enables checking of an object image to be captured and reproduction display of a captured image on the eyepiece portion 28.

FIG. 2C illustrates a state where the finder unit 41 including the eyepiece portion 28 is turned about an axis in the X direction in the state where the finder unit 20 (electronic viewfinder) is usable illustrated in FIG. 2B.

The finder unit 41 is turned approximately 90 degrees so that the eyepiece portion 28 is parallel to the top cover 9. In other words, the eyepiece window 22 is turned up to a state of facing in a +Y direction of the image capturing apparatus 1.

Thus, the operator can check an object image to be captured and reproduction display of a captured image from the top surface side of the image capturing apparatus 1.

(Developed Perspective View of Finder Unit 20)

A configuration of the finder unit 20 is described with reference to FIGS. 3A, 3B, 3C, and 3D.

FIG. 3A is a developed perspective view of the finder unit 20.

The finder unit 20 includes an exterior cover 21, a popup mechanism unit 31, a finder substrate unit 51, and the finder unit 41.

The exterior cover 21 constitutes an exterior surface that covers side surfaces and a front surface of the finder unit 41. The exterior cover 21 is manufactured by, pressing a metal plate.

Next, the popup mechanism unit 31 that is slidable in the Y direction to switch between the housed state and the protruding state of the finder unit 20 is described.

A base plate 32 as a fixing member is manufactured by pressing a metal plate, and two guide bars 33 each made of a metal material are swaged to the base plate 32.

Further, a locking pin 32a is swaged to the base plate 32. The guide bars 33 as guide members are each provided with a flange portion 33a that is large in a radial direction.

A finder holder 30 is made of a resin material. The two guide bars 33 swaged to the base plate 32 are inserted into the finder holder 30, and the finder holder 30 holds the two guide bars 33 to be slidable in the Y direction.

The flange portions 33a of the respective guide bars 33 comes in contact with the finder holder 30 to determine the position in the Y direction of the finder unit 20 in the protruding state.

The finder holder 30 is fixed while being positioned relative to the top cover 9 (see FIG. 1B).

Protrusion springs 38 are housed inside the finder holder 30, and urge the respective guide bars 33 as the guide members upward in the Y direction.

A sub-plate 35 is manufactured by pressing a metal plate, and is fixed while being positioned relative to the finder holder 30 to hold end parts of the protrusion springs 38.

A popup lock lever 36 is held by a swage pin 37 extending in the X direction to be turnable relative to the sub-plate 35, and includes an engaging claw 36a.

An urging spring 34 has one end engaged with the popup lock lever 36 and the other end engaged with the sub-plate 35, and urges the popup lock lever 36 in one direction.

The popup lock lever 36 is configured to turn about the swage pin 37 in response to operation of the unlock lever 11 illustrated in FIG. 1A.

When housed, the finder unit 20 is held in the housed state by the locking pin 32a of the base plate 32 being locked with the engaging claw 36a of the popup lock lever 36.

To use the finder unit 20, the unlock lever 11 (see FIG. 1A) is operated, and the popup lock lever 36 turns to unlock the locking pin 32a. As a result, the finder unit 20 protrudes by the protrusion springs 38.

Further, a hinge device 81 coupled with the base plate 32 to be turnable about the axis in the X direction is held on an upper side of the base plate 32 in the Y direction.

(Developed Perspective View of Finder Unit 41)

Next, a configuration of the finder unit 41 is described with reference to FIG. 3B.

FIG. 3B is a developed perspective view of the finder unit 41.

The finder unit 41 includes a display device 46, the eyepiece portion 28, a lens holder 42 holding a lens that guides a light flux emitted from the display device 46 to the eyepiece portion 28, and a guide barrel 43 movably holding the lens holder 42 in the Z direction.

The guide barrel 43 includes a flange portion 43a, and a guide shaft 44 movably guiding the guide barrel 43 in the Z direction penetrates through the flange portion 43a.

One end of the guide shaft 44 is fixed to a fixing barrel 45.

The eyepiece portion 28 is engaged with the guide barrel 43 by engaging claws 43c provided on side surfaces of the guide barrel 43.

When the eyepiece portion 28 is pulled out in the Z direction, the guide barrel 43 supported by the guide shaft 44 is translated integrally with the lens holder 42 inside the guide barrel 43, which puts the eyepiece portion 28 into the usable state.

A seal member 43b is provided on an outer periphery of the flange portion 43a of the guide barrel 43.

The seal member 43b seals a space between the fixing barrel 45 and the guide barrel 43 to form a dustproof structure.

The display device 46 is adhered to and fixed to a display unit holder 47 with a double-sided tape (not illustrated). An engaging claw 47a is provided on a side surface of the display unit holder 47, and is engaged with an engaging portion 45a of the fixing barrel 45.

A display unit cover 48 is fixed to the fixing barrel 45 while being positioned to cover a rear surface of the display device 46.

The fixing barrel 45 includes screw seats 45b to which an arm plate 82, which will be described below (see FIGS. 4A to 4D), is fixed.

A cam-shaped portion 61 is disposed inside the guide barrel 43, and is slidably fitted to the guide barrel 43 in an integrated manner with a diopter adjustment lever 60 disposed outside the guide barrel 43.

When the diopter adjustment lever 60 is turned, the lens holder 42 is moved in the Z direction by the cam-shaped portion 61 inside the guide barrel 43.

Accordingly, the user can adjust diopter of the finder by turning the diopter adjustment lever 60.

The detection sensor flexible substrate 71 is mounted together with the eyepiece sensor 72 that detects that the user has looked into the eyepiece portion 28 and switches display from the display device 6 (see FIG. 1B) to the finder unit 20.

The detection sensor flexible substrate 71 is mounted together with a pullout detection sensor 73 that detects that the eyepiece portion 28 has been pulled out and activates the eyepiece sensor 72.

The eyepiece sensor 72 and the pullout detection sensor 73 are described in detail with reference to FIGS. 7A and 7B.

The detection sensor flexible substrate 71 is disposed on an upper side of the fixing barrel 45 in the Y direction.

A detection sensor cover 49 is fixed to the eyepiece portion 28 so as to cover an upper side of the pullout detection sensor 73 of the detection sensor flexible substrate 71 in the Y direction.

The detection sensor cover 49 further includes a bent portion 49a that presses a rear surface of the eyepiece sensor 72, and presses the eyepiece sensor 72 against a rear surface of the sensor window 23.

(Configuration of Finder Substrate Unit 51)

The finder substrate unit 51 is provided between the finder unit 41 and the popup mechanism unit 31. A configuration of the finder substrate unit 51 is described with reference to FIGS. 3C and 3D.

Figure 3C:
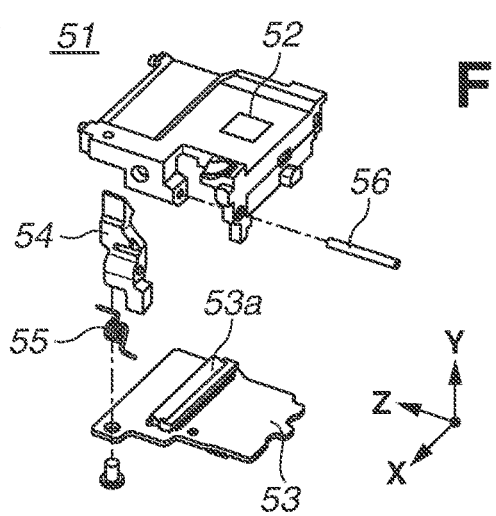
Figure 3D:
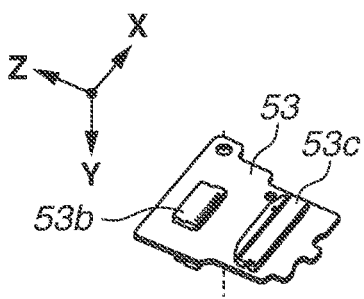

FIG. 3C is a developed perspective view of the finder substrate unit 51 as viewed from a top surface, and FIG. 3D is a developed perspective view of a finder substrate 53 as viewed from a rear surface.

The finder substrate 53 is fixed to a finder substrate base 52.

The finder substrate 53 includes a connector 53a to which a flexible substrate wired from the display device 46 is connected.

Further, a connector 53b to which the detection sensor flexible substrate 71 is connected, and a connector 53c to which a flexible substrate (not illustrated) that transmits an image signal or the like from a main substrate (not illustrated) inside the image capturing apparatus 1 is connected, are provided on the back surface of the finder substrate 53.

A turn locking member 54 is urged by an urging spring 55. A turn locking shaft 56 penetrates through the turn locking member 54, and both ends of the turn locking shaft 56 are supported by the finder substrate base 52.

In other words, the turn locking member 54 is a member that turns toward the fixing barrel 45 about the turn locking shaft 56.

The turn locking shaft 56 may be integrated with the turn locking member 54. The turn locking member 54 locks the fixing barrel 45.

The turn locking member 54 is covered with the side surface of the eyepiece portion 28 until the finder unit 20 moves from the state of being housed in the image capturing apparatus 1 to the state of protruding upward in the Y direction, and is not turnable in a direction in which the fixing barrel 45 is unlocked.

Accordingly, when the finder unit 20 moves from the state of being housed in the image capturing apparatus 1 to the state of protruding upward in the Y direction, the finder unit 41 is surely locked without transitioning to an unintended state.

When the eyepiece portion 28 is pulled out, the turn locking member 54 is exposed from the side surface of the eyepiece portion 28, and becomes turnable in the direction in which the fixing barrel 45 is unlocked.

(Configuration of Hinge Device 81)

Next, a configuration of the hinge device 81 that turnably couples the finder unit 41 with a main body of the image capturing apparatus 1 about the X axis is described with reference to FIGS. 4A, 4B, 4C, and 4D.

Figure 4A:
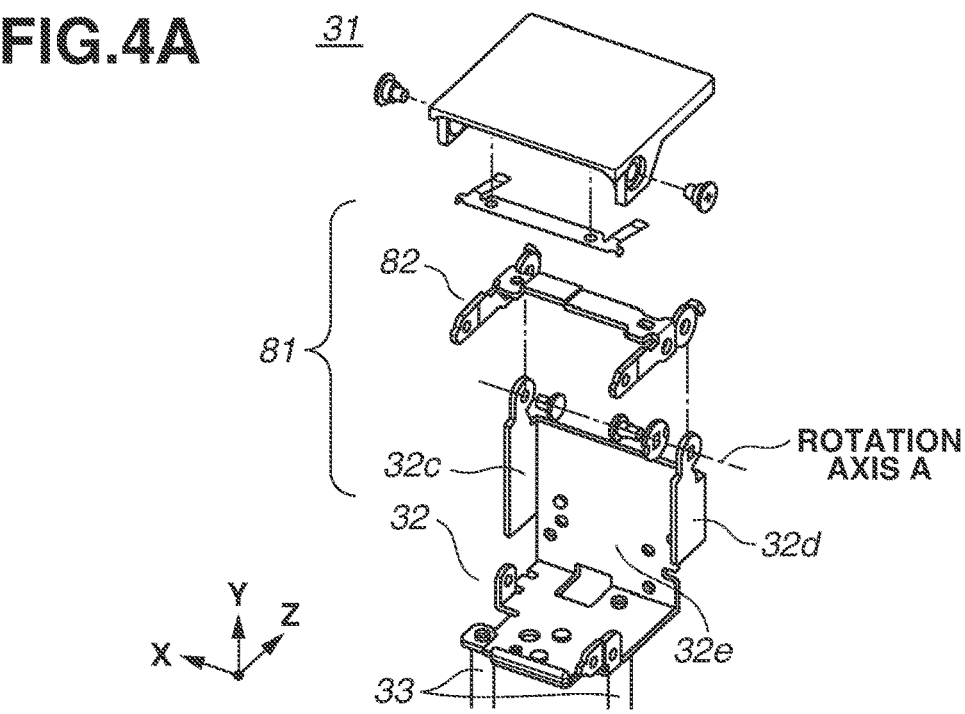
FIGS. 4A, 4B, 4C, and 4D are developed perspective views illustrating a hinge device of the finder unit.
Figure 4B:
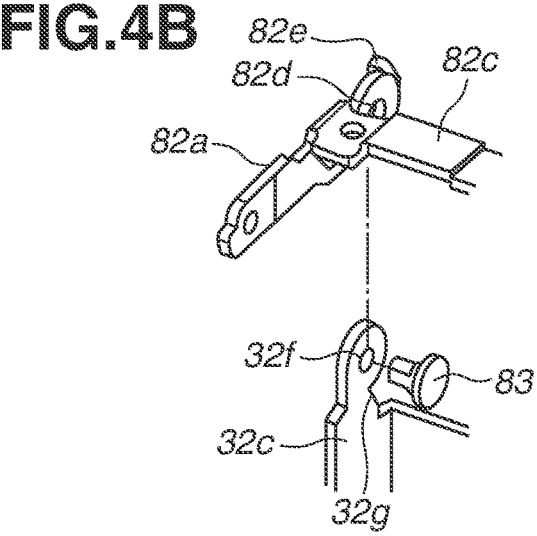
Figure 4C:
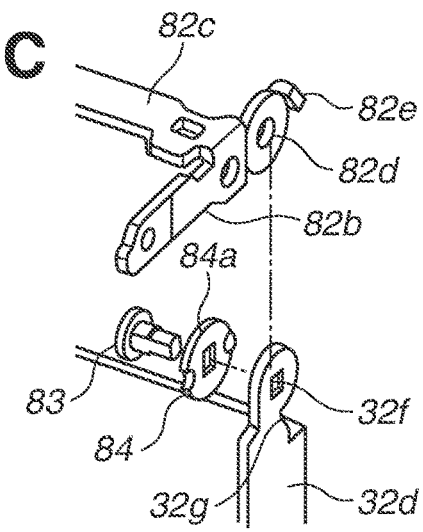

FIG. 4A is a developed perspective view of the hinge device 81, and FIGS. 4B and 4C are enlarged views each illustrating a portion near a rotation axis in an enlarged manner.

The hinge device 81 includes the base plate 32, the arm plate 82, swage pins 83, and a disc spring 84.

The base plate 32 is a part that is manufactured by pressing a metal plate structural frame to which the guide bars 33 are swaged and to which the exterior cover 21 (see FIG. 3A) and the finder substrate unit 51 (see FIG. 3A) are further attached. The base plate 32 serves as a structural frame of the finder unit 20

The base plate 32 includes a first surface 32c and a second surface 32d that are parallel to an optical axis direction (Z direction) of the finder lens and are parallel to a movable direction (Y direction) of the finder unit 20.

Each of the first surface 32c and the second surface 32d includes a hole 32f, and a rotation regulation portion 32g near the hole 32f.

The first surface 32c and the second surface 32d parallel to each other are coupled to a third surface 32e that is positioned on a front side of the first surface 32c and the second surface 32d parallel to each other, in the Z direction.

The first surface 32c and the second surface 32d parallel to each other, and the third surface 32e are disposed in a substantially U-shape in a cross-section (XZ plane) orthogonal to the movable direction of the finder unit 20.

The arm plate 82 is manufactured by pressing a metal plate, and includes a first surface 82a and a second surface 82b that are parallel to the optical axis direction (Z direction) of the finder lens and are parallel to the movable direction (Y direction) of the finder unit 20.

The first surface 82a and the second surface 82b are coupled by a coupling portion 82c extending in the X direction.

Each of the first surface 82a and the second surface 82b parallel to each other includes a hole 82d, and a standing bent portion 82e extending in an axis direction of the hole 82d near the hole 82d.

The holes 32f of the base plate 32 and the holes 82d of the arm plate 82 are coaxially disposed to form a rotation axis A about which the finder unit 41 rotates.

When the arm plate 82 is rotated upward by substantially 90 degrees, the standing bent portions 82e of the arm plate 82 comes into contact with the respective rotation regulation portions 32g of the base plate 32, which regulates an upward rotation angle of the finder unit 41.

The swage pins 83 are swaged in a state of being inserted into the respective holes 32f of the base plate 32, the respective holes 82d of the arm plate 82, and a hole 84a of the disc spring 84 (when provided).

As a result, the base plate 32 as a base member and the arm plate (turning member) 82 are rotatably coupled with each other about the rotation axis A, and falling off of the swage pins 83 is prevented.

The disc spring 84 is fixed while being bent in the rotation axis direction, which applies a rotation torque to rotate the finder unit 41 about the rotation axis.

As a result, the arm plate 82 can be held at any rotation position relative to the base plate 32.

In the present exemplary embodiment, the disc spring 84 is disposed on only one side (right side) of the rotation axis; however, the disc spring 84 may be disposed on each of right and left sides of the rotation axis.

The image capturing apparatus 1 includes the electronic viewfinder unit (finder unit) 20 movable to the housed state where the electronic viewfinder unit 20 is housed in the main body and the protruding state where the electronic viewfinder unit 20 protrudes from the main body.

The electronic viewfinder unit 20 includes the finder unit 41 including the display device 46, the eyepiece portion 28, and the lens holder 42 holding the lens that guides the light flux emitted from the display device 46 to the eyepiece portion 28.

The electronic viewfinder unit 20 includes the base plate 32 including the guide bars 33 that guide the electronic viewfinder unit 20 to the housed state and the protruding state.

The base plate 32 includes a holding portion provided with the first surface 32c and the second surface 32d facing each other with the optical axis of the lens in between.

The base plate 32 includes the arm plate 82 that has one end held by the first surface 32c and the other end held by the second surface 32d, and is turnable about an axis orthogonal to the optical axis of the lens.

The finder unit 41 is held by the arm plate 82.

The first surface 32c and the second surface 32d are disposed within a projection surface of side walls 28a of the eyepiece portion 28 into which the user looks, as viewed from the optical axis direction of the lens.

The first surface 32c and the second surface 32d are disposed at positions not overlapped with the side walls 28a of the eyepiece portion 28, as viewed from the rotation axis direction of the arm plate 82.

The first surface 32c and the second surface 32d are covered with the exterior cover 21, and a width of the exterior cover 21 in a direction orthogonal to the optical axis direction is less than a width between the first surface 32c and the second surface 32d in the direction orthogonal to the optical axis direction of the lens.

The arm plate 82 generates a torque to hold the finder unit 41 by the disc spring 84.

(Configuration Of Finder Top Unit 91)

Next, a configuration of a finder top unit 91 forming the top surface on the appearance side of the finder unit 20 is described with reference to FIG. 4D.

Figure 4D:
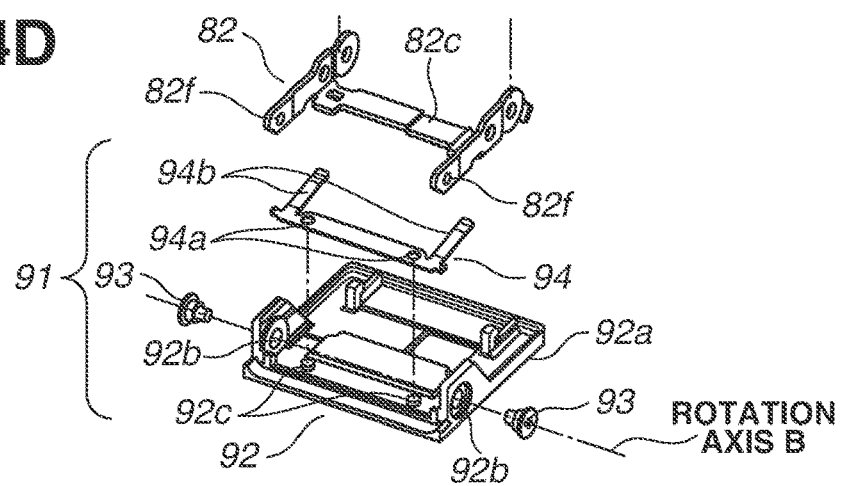

FIG. 4D is a developed perspective view of the finder top unit 91 as viewed from a rear surface.

The top surface on the appearance side of the finder unit 20 is covered with a cover portion 92a of a top cover 92. The top cover 92 includes holes 92b into which respective stepped screws 93 forming a rotation axis of the top cover 92 are inserted. The holes 92b are coaxially provided on respective side surfaces of the top cover 92.

The holes 92b of the top cover 92 are provided on a side close to the eyepiece portion 28 in the Z direction relative to the rotation axis A of the finder unit 41.

The arm plate 82 includes screw holes 82f supporting the stepped screws 93 forming the rotation axis of the top cover 92. The screw holes 82f are provided coaxially with the holes 92b of the top cover 92.

The stepped screws 93 are inserted into the respective holes 92b of the top cover 92, and are screwed into and fixed by the respective screw holes 82f of the arm plate 82.

As a result, the top cover 92 and the arm plate 82 are coupled to be rotatable about a rotation axis B.

A top cover urging member 94 is a part manufactured by pressing a metal plate, and includes holes 94a.

The top cover urging member 94 is fixed in such a manner that shafts 92c provided on a non-appearance surface of the top cover 92 are inserted into the respective holes 94a of the top cover urging member 94 and are fixed by thermal swaging.

The top cover urging member 94 further includes elastic deformation portions 94b. The elastic deformation portions 94b are hooked on the coupling portion 82c of the arm plate 82 to urge the top cover 92 against the arm plate 82.

In the present exemplary embodiment, a plate spring is used to urge the top cover 92 against the arm plate 82. Alternatively, another elastic member such as a torsion spring or a rubber may be used.

The image capturing apparatus 1 includes the top cover 92 forming the upper surface of the electronic viewfinder unit 20, and the top cover 92 is turnably held relative to the arm plate 82. The top cover urging member 94 is disposed on a back side of the upper surface of the top cover 92.

The top cover urging member 94 includes the elastic deformation portions 94b elastically deformable in the direction in which the electronic viewfinder unit 20 moves to be in the housed state and the protruding state, and urges the top cover 92 against the arm plate 82 by causing the elastic deformation portions 94b to hook on the arm plate 82.

The electronic viewfinder unit 20 includes the eyepiece sensor 72 configured to detect approaching of the user to the eyepiece portion 28, and the detection sensor flexible substrate 71 on which the eyepiece sensor 72 is mounted.

The detection sensor flexible substrate 71 is disposed between the finder unit 41 and the top cover 92. As viewed from the upper surface of the top cover 92, the detection sensor flexible substrate 71 and the elastic deformation portions 94b of the top cover urging member 94 are disposed at positions not overlapped with each other.

The electronic viewfinder unit 20 displays an image captured through the lens.

(Developed Perspective View illustrating Assembly of Electronic Viewfinder Unit 20)

Figure 5A:
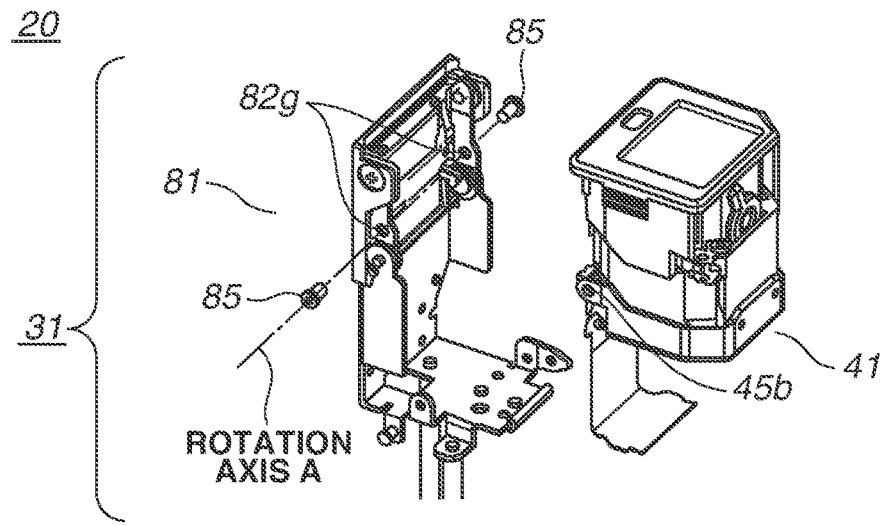
FIGS. 5A, 5B, and 5C are developed perspective views illustrating a state where units of the finder unit are assembled.
Figure 5B:
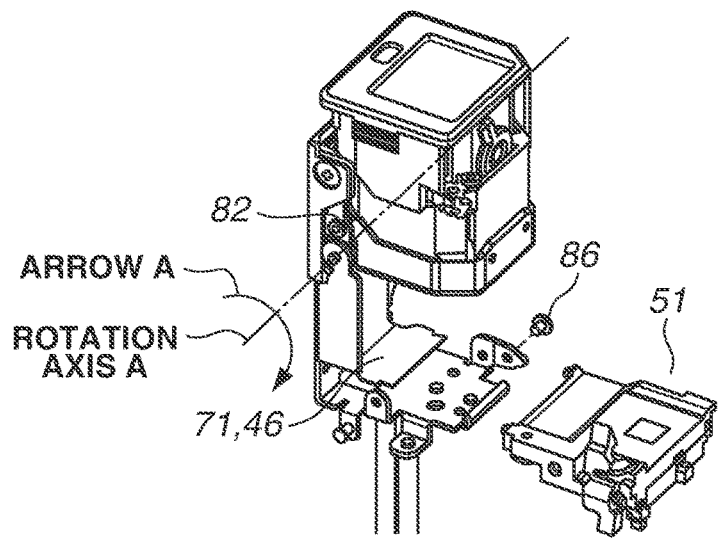
Figure 5C:
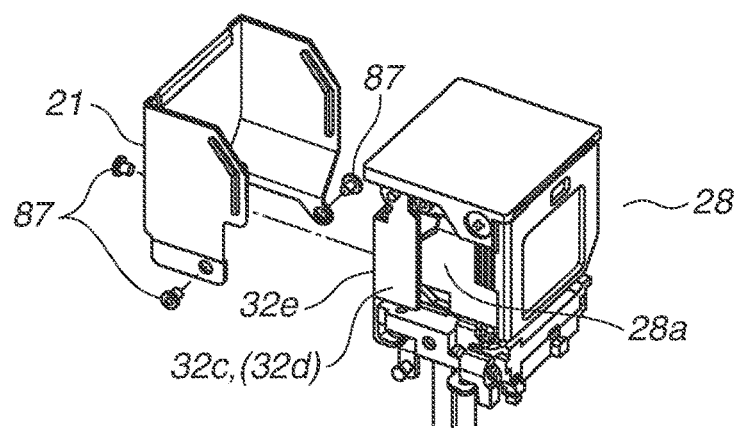

FIGS. 5A, 5B, and 5C are developed perspective views each illustrating a state where the finder unit 20 is assembled.

The fixing barrel 45 of the finder unit 41 includes the screw seats 45b provided for fixing.

The arm plate 82 includes holes 82g into which respective finder fixing screws 85 are inserted.

In the state where the arm plate 82 is rotated about 90 degrees, the finder unit 41 is assembled to and positioned on the arm plate 82 of the hinge device 81 of the popup mechanism unit 31.

The finder fixing screws 85 are fastened with the respective screw seats 45b of the fixing barrel 45 through the respective holes 82g of the arm plate 82, thereby fixing the finder unit 41 to the arm plate 82.

As described above, the hinge device 81 is unitized in advance with the popup mechanism unit 31 while being turnably held. This facilitates assembly of the finder unit 41.

Subsequently, a state where the finder unit 41 is fixed to the arm plate 82 is described.

In this state, the flexible substrate of the display device 46 and the detection sensor flexible substrate 71 wired from the finder unit 41 are respectively connected to the connectors 53a and 53b (see FIGS. 3C and 3D) of the finder substrate 53 fixed on a lower side of the finder substrate unit 51.

Thereafter, the finder substrate unit 51 is positioned on the base plate 32 and is fixed with a screw 86.

Finally, in a state where the finder unit 41 is rotated about the rotation axis A in an arrow A direction, the exterior cover 21 is assembled to the base plate 32 from a front side in the optical axis direction (Z direction) of the finder, and is fixed with screws 87.

As a result, the first surface 32c, the second surface 32d, and the third surface 32e of the base plate 32 as the structural frame, and the side walls 28a of the eyepiece portion 28 are covered and hidden with the exterior cover 21.

(Size of Finder Unit 20 in Width Direction (X Direction))

Figure 6A:
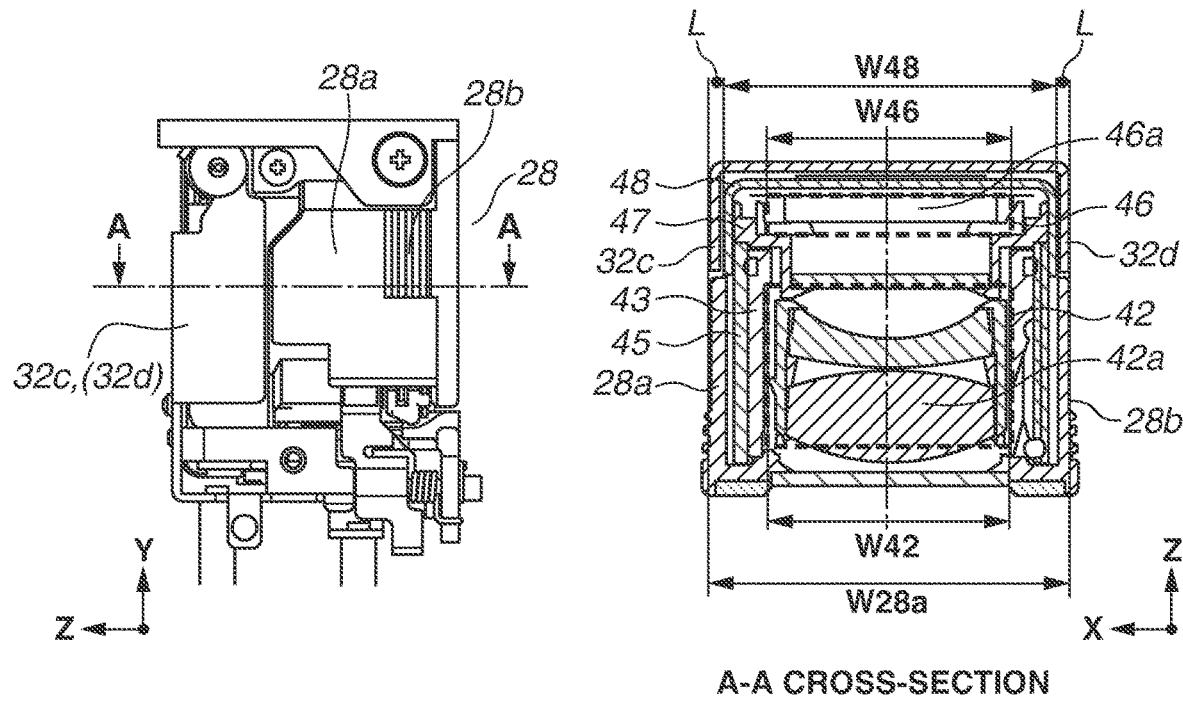
FIGS. 6A and 6B are side views and cross-sectional views of the finder unit.
Figure 6B:
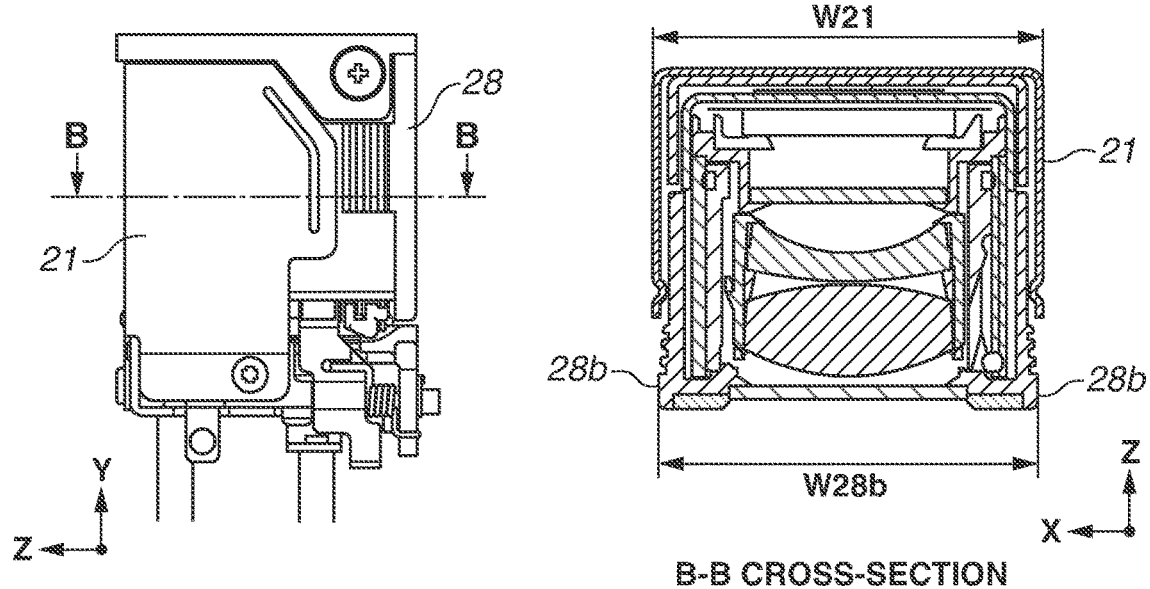

FIGS. 6A and 6B are diagrams illustrating a size of the finder unit 20 in a width direction (X direction).

FIG. 6A is a side view and a cross-sectional view illustrating a state where the exterior cover 21 is removed from the finder unit 20. FIG. 6B is a side view and a cross-sectional view illustrating a state where the finder unit 20 is complete.

The eyepiece portion 28 includes the side walls 28a covered with the exterior cover 21, and grip portions 28b gripped by the user when the user pulls out the eyepiece portion 28. A width W28b between the grip portions 28b is greater than a width W28a between the side walls 28a.

A lens portion 42a inside the lens holder 42 guides light emitted from a light emitting portion 46a of the display device 46 to the eyepiece portion 28. Thus, the lens portion 42a has a size equivalent to a size of the light emitting portion 46a of the display device 46.

In other words, a width W42 of the lens holder 42 holding the lens portion 42a is equivalent to a width W46 of the display device 46.

The lens holder 42 is surrounded by the minimum number of components that are the guide barrel 43 holding the lens holder 42, the fixing barrel 45 holding the guide barrel 43, and the eyepiece portion 28 covering the fixing barrel 45 to form the appearance surface, in order from a lens center side. The lens holder 42 surrounded by the components has a width equal to the width W28a of the eyepiece portion 28.

The display device 46 is surrounded by the minimum number of components that are the display unit holder 47 covering the display device 46 from the front side, and the display unit cover 48 covering the display device 46 from the rear side, in order from a center of the display device 46. The display device 46 surrounded by the components has a width equal to the width W48 of the display unit cover 48.

The components surrounding the lens holder 42 and the display device 46 each have a complicated shape to prevent the light emitted from the display device 46 from leaking from a position other than the eyepiece portion 28.

Thus, the components are often manufactured by resin molding, which has a high degree of flexibility in shape. In other words, a distance L corresponding to a resin thickness enabling resin molding is provided on each of both sides of the display unit cover 48 in the width direction.

The first surface 32c and the second surface 32d of the base plate 32 are manufactured by pressing a metal plate higher in rigidity than the resin molded component.

Thus, the first surface 32c and the second surface 32d can be disposed in the respective distances L by being disposed not to overlap the side walls 28a of the eyepiece portion 28 in the optical axis direction direction).

The exterior cover 21 is a component constituting the appearance surface covering the base plate 32 and the eyepiece portion 28.

Alternatively, the arm plate 82 may be held by the exterior cover 21; however, when a thickness of the exterior cover 21 is increased to increase rigidity of the exterior cover 21, a width W21 of the finder unit 20 is increased.

In other words, the exterior cover 21 is configured as a component not requiring rigidity as compared with the base plate 32, which enables reduction in the thickness of the exterior cover 21 as compared with the base plate 32, and enables a reduction of the width W21 of the exterior cover 21.

The first surface 32c and the second surface 32d of the base plate 32 are disposed in the respective distances L in such a configuration, which makes it possible to downsize the finder unit 20 in the width direction.

(Description of Detection Sensor Flexible Substrate 71)

Figure 7A:
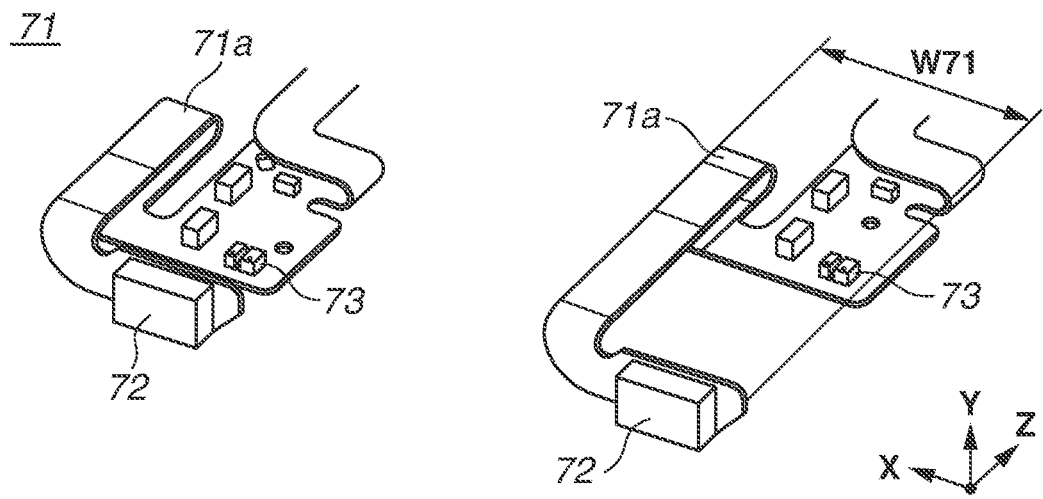
FIGS. 7A and 7B are diagrams illustrating positional relationship between a detection sensor flexible substrate and a top cover urging member.
Figure 7B:
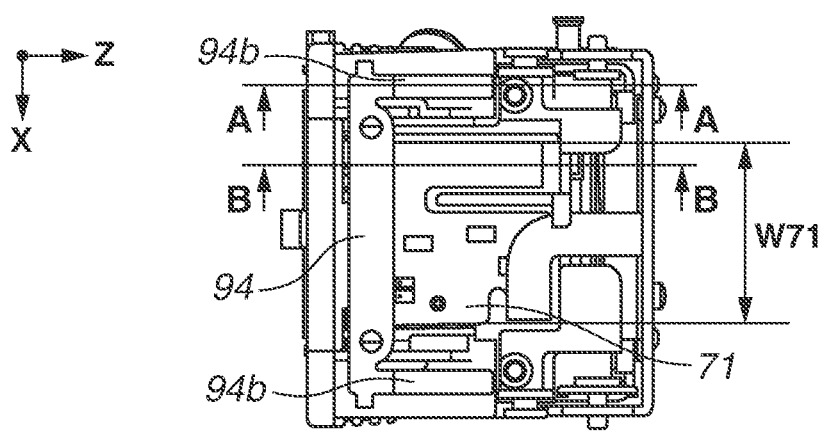
Figure 7B:
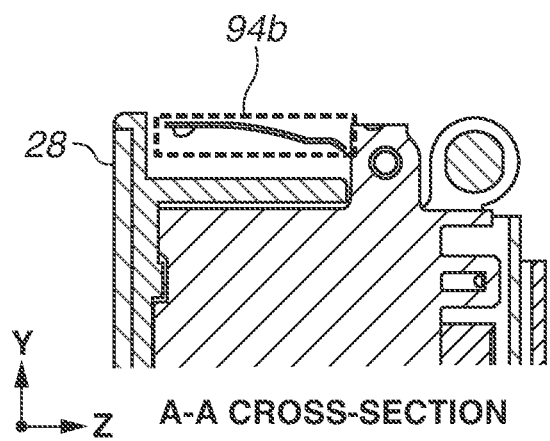
Figure 7B:
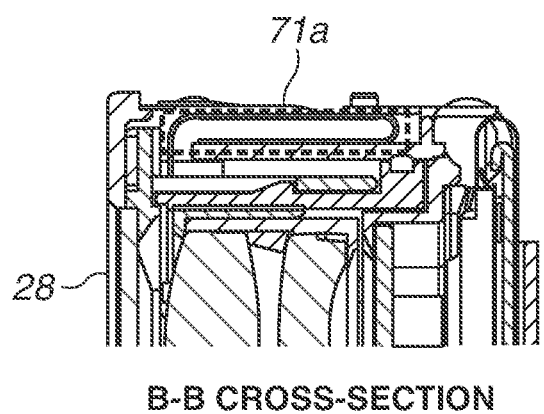

FIGS. 7A and 7B are diagrams illustrating the detection sensor flexible substrate 71 including the eyepiece sensor 72 and the pullout detection sensor 73.

FIG. 7A is a diagram illustrating the detection sensor flexible substrate 71 in a state where the eyepiece portion 28 is housed and in a state the eyepiece portion 28 is pulled out.

FIG. 7B is a top view and cross-sectional views in a state where the top cover 92 (see FIG. 4D) and the arm plate 82 are removed from the finder unit 20.

The detection sensor flexible substrate 71 is mounted with the eyepiece sensor 72 that switches the display when the user approaches the eyepiece portion 28.

The detection sensor flexible substrate 71 is further mounted with the pullout detection sensor 73 that activates detection by the eyepiece sensor 72 when the eyepiece portion 28 positioned near the pullout detection sensor 73 is pulled out.

The eyepiece sensor 72 and the pullout detection sensor 73 each detect whether an object has approached each sensor.

Each of the eyepiece sensor 72 and the pullout detection sensor 73 according to the present exemplary embodiment includes a light emitting portion and a light receiving portion. Detection light such as infrared light emitted from the light emitting portion is reflected on the object to be detected, and the reflected light is received by the light receiving portion. As a result, approaching of the object to be detected is detected.

One end of the detection sensor flexible substrate 71 is connected to the connector 53b (see FIG. 3D) of the finder substrate 53, and the other end thereof is provided with the eyepiece sensor 72.

The eyepiece sensor 72 is pressed by the bent portion 49a (see FIG. 3B) of the detection sensor cover 49 to be constantly in contact with the sensor window 23 of the eyepiece portion 28 with no gap, and moves integrally with the eyepiece portion 28 in the Z direction.

The pullout detection sensor 73 is disposed between the fixing barrel 45 and the top cover 92, and is fixed to the top surface of the fixing barrel 45.

In the state where the eyepiece portion 28 is not pulled out, the pullout detection sensor 73 is covered with the detection sensor cover 49 and detects that the eyepiece portion 28 is positioned near the pullout detection sensor 73.

When the eyepiece portion 28 is pulled out, the pullout detection sensor 73 is exposed from the detection sensor cover 49, and detects that the eyepiece portion 28 is not positioned near the pullout detection sensor 73.

The pullout detection sensor 73 determines whether the eyepiece portion 28 has been pulled out, through the detection. In a case where the pullout detection sensor 73 determines that the eyepiece portion 28 has been pulled out and is not positioned near the pullout detection sensor 73, the pullout detection sensor 73 activates the eyepiece sensor 72.

In other words, in the state where the eyepiece portion 28 is not pulled out, the eyepiece sensor 72 is not activated, which makes it possible to save power consumption.

As described above, the eyepiece sensor 72 moves integrally with the eyepiece portion 28, whereas the pullout detection sensor 73 is fixed to the fixing barrel 45 without moving integrally with the eyepiece portion 28.

A foldable extra-length portion 71a that moves integrally with the eyepiece portion 28 in the pullout direction (Z direction) is provided between the eyepiece sensor 72 and the pullout detection sensor 73 of the detection sensor flexible substrate 71.

The foldable extra-length portion 71a is repeatedly folded every time the eyepiece portion 28 is retracted and pulled out. Thus, if a folding radius of the foldable extra-length portion 71a is made extremely small, a wire may be broken.

In other words, a space in the Y direction is necessary to secure the appropriate folding radius of the foldable extra-length portion 71a.

The eyepiece sensor 72 is disposed so that a short side of the eyepiece sensor 72 extends in the Y direction.

One end of the foldable extra-length portion 71a is connected to a surface mounted with the eyepiece sensor 72 at a position extended from the eyepiece sensor 72 in the longitudinal direction (X direction), and the other end thereof is connected to a surface mounted with the pullout detection sensor 73.

Disposing the eyepiece sensor 72 and the pullout detection sensor 73 at positions overlapped with each other as viewed from the Z direction makes it possible to reduce a size W71 of the detection sensor flexible substrate 71 in the width direction (X direction).

The top cover urging member 94 that urges the top cover 92 (see FIG. 41)) against the arm plate 82 is attached to the top cover 92.

The elastic deformation portions 94b of the top cover urging member 94 are hooked on the arm plate 82 by elastically deforming respective front ends of the elastic deformation portions 94b in the Y direction. As a result, force that pulls the top cover 92 toward the center of the rotation axis B is generated.

To obtain the urging force that pulls the top cover 92 as described above, it is necessary for the elastic deformation portions 94b of the top cover urging member 94 to each have a space in the Y direction.

The elastic deformation portions 94b of the top cover urging member 94 are disposed at positions not overlapped with the width W71 of the detection sensor flexible substrate 71 as viewed from the top surface side.

Thus, the elastic deformation portions 94b can be disposed so as to be overlapped with the foldable extra-length portion 71a of the detection sensor flexible substrate 71 requiring a large space in the Y direction as viewed from the side surface direction.

The detection sensor flexible substrate 71 and the elastic deformation portions 94b of the top cover urging member 94 are disposed in the above-described manner, which makes it possible to reduce the height of the finder unit 41 in the Y direction.

Although the exemplary embodiment of the present disclosure has been described above, the present disclosure is not limited to the exemplary embodiment, and various modifications and alternations can be made within the scope of the present disclosure.

In the exemplary embodiment of the present disclosure, it is possible to provide the electronic apparatus including the small-sized finder that is movable to the housed state and the protruding state and is turnable in the protruding state.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-109436, filed Jun. 25, 2020, which is hereby incorporated by reference herein in its entirety.

What is claimed is:

1. An electronic apparatus including an electronic viewfinder unit movable to a housed state where the electronic viewfinder unit is housed in a main body and a protruding state where the electronic viewfinder unit protrudes from the main body, the electronic apparatus comprising:
   a finder unit of the electronic viewfinder unit including
      a display unit,
      an eyepiece portion, and
      a lens holding member holding a lens that guides a light flux emitted from the display unit to the eyepiece portion; and
   a base member of the electronic viewfinder unit including
      a guide member configured to guide the electronic viewfinder unit to the housed state and the protruding state,
      a holding portion being provided with a first holding member and a second holding member that face each other with an optical axis of the lens in between, and
      a turning member having one end held by the first holding member and another end held by the second holding member, the turning member being turnable about an axis orthogonal to the optical axis of the lens,
   wherein the finder unit is held by the turning member, and
   wherein the first holding member and the second holding member are disposed at positions not overlapped with side walls of the eyepiece portion, as viewed from the rotation axis direction of the turning member.

2. The electronic apparatus according to claim 1, wherein the first holding member and the second holding member are disposed within a projection surface of side walls of the eyepiece portion into which a user looks, as viewed from an optical axis direction of the lens.

3. The electronic apparatus according to claim 1,
   wherein the first holding member and the second holding member are covered with an exterior cover, and
   wherein a width of the exterior cover in a direction orthogonal to an optical axis direction of the lens is less than a width between the first holding member and the second holding member in the direction orthogonal to the optical axis direction of the lens.

4. The electronic apparatus according to claim 1, wherein the turning member generates a torque holding the finder unit by a rotation shaft portion.

5. The electronic apparatus according to claim 1, further comprising a top cover forming an upper surface of the electronic viewfinder unit,
   wherein the top cover is turnably held by the turning member,
   wherein an urging member is disposed on a back side of the upper surface of the top cover, and
   wherein the urging member includes an elastic deformation portion elastically deformable in a direction in which the electronic viewfinder unit moves to the housed state and the protruding state, and urges the top cover against the turning member by causing the elastic deformation portion to hook on the turning member.

6. The electronic apparatus according to claim 5,
   wherein the electronic viewfinder unit includes an eyepiece sensor configured to detect approaching of a user to the eyepiece portion, and a flexible substrate mounted with the eyepiece sensor,
   wherein the flexible substrate is disposed between the finder unit and the top cover, and
   wherein, as viewed from the upper surface of the top cover, the flexible substrate and the elastic deformation portion of the urging member are disposed at positions not overlapped with each other.

7. The electronic apparatus according to claim 1, wherein the electronic viewfinder unit displays an image captured through the lens.

* * * * *